United States Patent [19]

Redman

[11] 4,184,382

[45] Jan. 22, 1980

[54] LEVER ARM ASSEMBLY

[75] Inventor: Ronald E. Redman, Niles, Mich.

[73] Assignee: Kawneer Company, Inc., Niles, Mich.

[21] Appl. No.: 856,316

[22] Filed: Dec. 1, 1977

[51] Int. Cl.[2] .................. F16B 43/00; F16B 29/00; F16B 35/00

[52] U.S. Cl. .................. 74/522; 85/1 R; 85/50 B; 248/316 E; 403/374

[58] Field of Search .................. 403/373, 374; 151/44; 248/316 E; 85/50 B, 1 R; 74/522, 525, 523, 519

[56] References Cited

U.S. PATENT DOCUMENTS

| | | | |
|---|---|---|---|
| 1,322,624 | 11/1919 | Rosenblatt | 151/44 |
| 2,217,656 | 10/1940 | Boehme | 403/374 X |
| 3,006,443 | 10/1961 | Siler | 85/1 R X |
| 3,008,368 | 11/1961 | Hammitt et al. | 85/50 B X |
| 3,672,710 | 6/1972 | Kroopp | 403/374 X |
| 4,025,210 | 5/1977 | Johnson | 403/373 X |

FOREIGN PATENT DOCUMENTS

| | | | |
|---|---|---|---|
| 39911 | 7/1965 | German Democratic Rep. | 403/374 |

*Primary Examiner*—Samuel Scott
*Assistant Examiner*—Daniel J. O'Connor
*Attorney, Agent, or Firm*—Mason, Kolehmainen, Rathburn & Wyss

[57] ABSTRACT

A new and improved lever arm apparatus for door closers and the like is adapted to be detachably mounted on a rotary shaft and includes a lever arm formed of a thin piece of flat metal having a key-shaped opening dimensioned to receive a portion of the shaft extended transversely between opposite faces of the arm. A wedge plate or hub is adapted to be detachably mounted on one face of the lever arm and is also formed with a key-shaped opening for receiving a shaft. At least one removable fastener is provided for securing the wedge plate to the lever arm at a point outwardly of the openings and the hub or wedge plate includes a sloping cam surface engaged by the fastener for rotatably shifting the relative positions of the lever arm and wedge plate to tightly clamp the flatted surface of the key-shaped openings against the rotary shaft with a scissors-type pinching action.

7 Claims, 3 Drawing Figures

LEVER ARM ASSEMBLY

BACKGROUND OF THE INVENTION

1. Field of the Invention

The present invention relates to a new and improved lever arm assembly and more particularly to one including a thin flat lever arm adapted to be detachably mounted on a rotary shaft of a door closer or the like. Many swinging door applications have a need for a relatively thin flat lever arm extending between the shaft of the door closer and a slide which is mounted on the upper edge of the door. The vertical space available for a lever arm of a door closer is often extremely limited and additionally, problems have been encountered because of the difficulty of securing a thin flat arm onto a rotary shaft at right angles thereto in a manner sufficient to withstand without failure the repeated and reversing stress applications because of the high torque involved. Often times premature failure of the arms occurred at the region of attachment on the shaft.

2. Description of the Prior Art

Prior art door closures have utilized closer arms which were often formed of cast material and the end of the arm attached to the door closer shaft has proven to be a source of difficulty because of the enlargement in size needed on this portion in order to successfully withstand the repeated high stress torque applications caused during opening and closing of the door. Failure of prior arms of cast material is generally in the regions or areas of high stress application around the walls of the key-shaped openings in the enlarged end portion of the arm into which the shaft of the door closer is interfitted. Closer arms formed of cast material additionally have the disadvantage of requiring more space in a vertical direction because of the enlarged section modulars needed in order to reduce the stress application to an acceptable design limit. Prior art cast type closer arms require machining operations and thus, are relatively high in cost and are often difficult to mount and dismount from the shaft.

It is therefore an object of the present invention to provide a new and improved arm assembly adapted to be detachably mounted on a rotary shaft such as the shaft of a door closer or the like.

Another object of the present invention is to provide a new and improved lever arm assembly of the character described which employs a novel system for positively securing the arm to the shaft without requiring excessive depth or thickness of the arm.

Another object of the present invention is to provide a new and improved lever arm assembly of the character described which employs a hub or wedge plate which is adapted to rotate relative to the arm when fasteners are applied to secure the hub on the arm and the assembly in place on the shaft.

Yet another object of the present invention is to provide a new and improved lever arm assembly of the character described wherein the parts are formed from thin flat metal in stamping operations rather than being formed of cast material.

Another object of the invention is to provide a new and improved arm assembly which presents a neat, thin, flat appearance in elevation compatible with modern doors.

Yet another object of the present invention is to provide a new and improved lever arm assembly of the character described wherein a novel wedging or camming action is provided by the attachment of a hub or wedge plate for securing the arm in place on the shaft and which results in a scissors-type pinching action holding the arm securely on the shaft while requiring a minimum of shaft length.

Another object of the present invention is to provide a new and improved lever apparatus of the character described which is easily detached from and/or remounted upon the rotary shaft of a door closer or the like so that servicing and maintenance is enhanced.

Yet another object of the present invention is to provide a new and improved lever arm which is neat in appearance, economical to produce and easy to install, and which is suitable for most all door closer applications.

SUMMARY OF THE INVENTION

The foregoing and other objects and advantages of the present invention are accomplished in an illustrated embodiment comprising a new and improved lever arm assembly adapted to be detachably mounted on the rotary shaft of a door closer or the like. The lever arm assembly includes a thin flat lever arm having a key-shaped opening dimensioned to receive a portion of the shaft extended between opposite faces of the arm. A thin, flat hub or wedge plate is detachably mounted against one face of the lever arm and is also formed with a key-shaped opening for the shaft. At least one removable fastener is provided for securing the hub or wedge plate onto the lever arm at a point outwardly of the openings therein and a wedging surface is provided for shifting the relative rotative positions of the lever arm and the wedge plate as the fastener is tightened and thereby to provide a scissors-type pinching action on the shaft by the lever arm and wedge plate. This arrangement thus permits the use of a lever arm and wedge plate stamped out of thin, flat metal and requires a minimum shaft length for the arm assembly at the point of attachment. The lever arm assembly is readily detachable from the rotary shaft as the fastener(s) are loosened to relax the scissors-like pinching action. Service and maintenance of the door closer is facilitated and reattachment of the arm assembly on the shaft is simple and fast.

BRIEF DESCRIPTION OF THE DRAWINGS

For a better understanding of the invention, reference should be had to the following detailed description taken in conjunction with the drawings, in which:

FIG. 1 is an exploded, perspective, view illustrating a new and improved lever arm assembly in accordance with the features of the present invention and adapted to be detachably mounted on a rotary shaft of a door closer or the like;

FIG. 2 is a side, elevational view of the lever arm in an installed position on the door closer shaft; and FIG. 3 is a fragmentary horizontal sectional view looking in the direction of arrows 3—3 of FIG. 2.

DESCRIPTION OF THE PREFERRED EMBODIMENT

Figures 1, 2, 3:
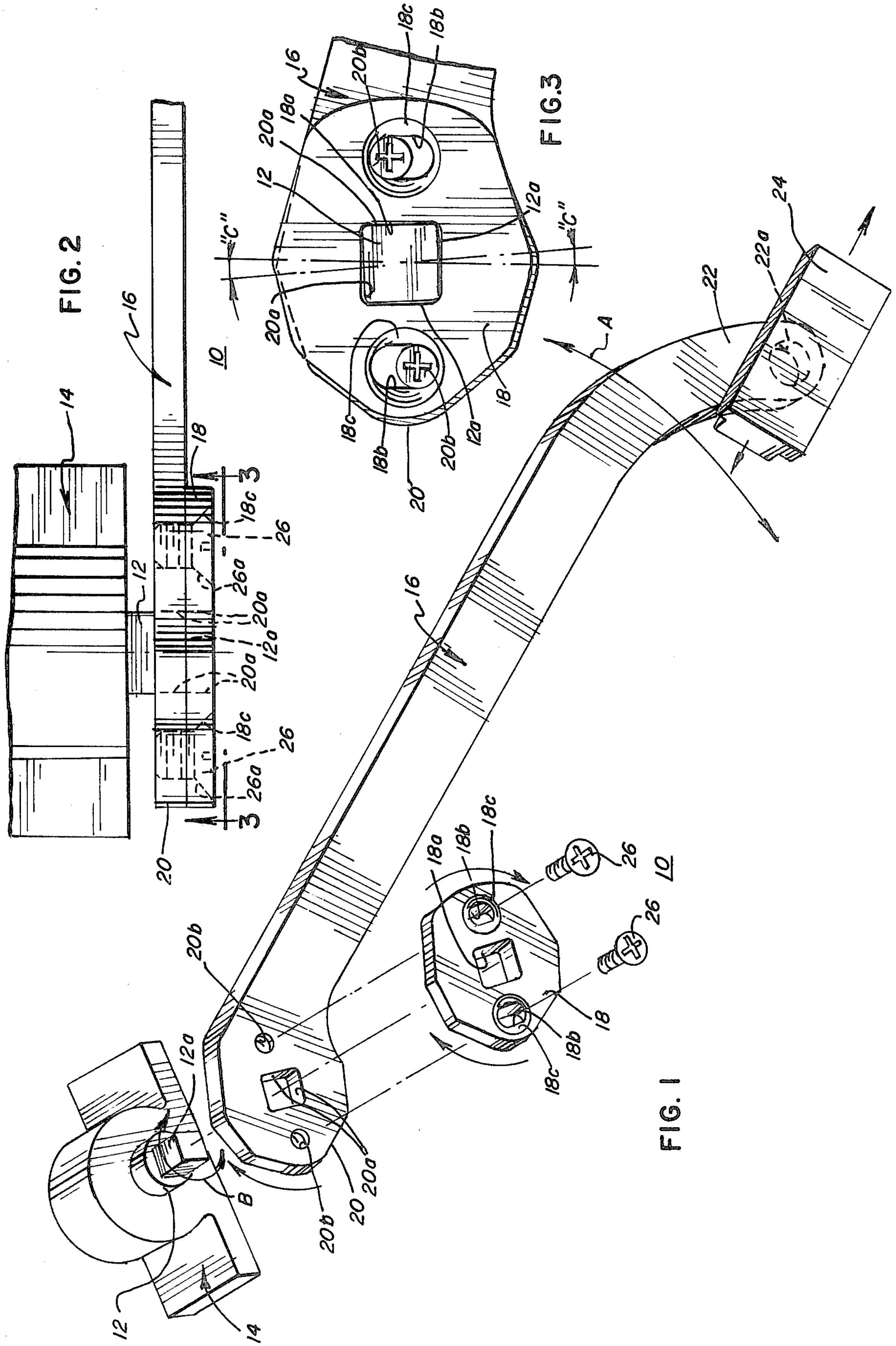

Referring now more particularly to the drawings, therein is illustrated a new and improved lever arm assembly constructed in accordance with the features of the present invention and referred to generally by the reference numeral 10. The arm assembly is adapted to be detachably mounted on a short lower end portion 12*a* of a rotary shaft 12 of an overhead door closer or the like referred to generally by the reference numeral 14. As illustrated in FIGS. 1 and 3, the lower end portion of the shaft is of a substantially square cross-section with short flatted segments in order to keyingly engage the lever arm assembly 10 and thereby rotate the arm as indicated by the arrow "A" in conjunction with the rotation of the shaft as indicated by the arrows "B".

In accordance with the invention, the lever arm assembly includes a thin flat lever arm 16 which may be economically produced in a punch press operation. The arm is formed from thin flat sheet stock and is used in combination with a hub or wedge member 18 formed in the same manner from similar material. The arm includes an enlarged, pivot end portion 20 shaped similar to the outline of the wedge plate or hub and at the opposite end the arm includes a curved end portion 22 having an opening **22*a* for accommodating a pivot pin supporting a door slide 24 which is adapted to slide along a keyway or track on the top of a door (not shown) associated with door closer 14**.

Referring to the enlarged end portion 20 of the arm 16, there is provided a punched out key-shaped opening of generally square shape at the central portion. The opening has flatted walls **20*a* adapted to closely fit against the flatted surfaces of lower end portion 12*a* of the shaft which projects through the lever in a transverse or right angle direction. On either side of the key-shaped opening in the arm, the enlarged pivot end portion 20 is provided with a pair of tapped or threaded holes 20*b* which are adapted to receive threaded shanks of a pair of flat-headed, cap screws 26 having frusto-conical wedging surfaces 26*a*** formed as a transition between the flat outer head surface and the threaded shank.

The hub or wedge plate 18 is provided with a central opening also of generally square shape having a plurality of flatted surfaces **18*a* adapted to interfit closely around the flat surfaces of the lower end 12*a* of the door closer shaft. Outwardly of the central key-shaped, shaft opening, the hub is provided with a pair of spaced apart, elliptically or racetrack-shaped openings 18*b* which are generally coaxially aligned with frusto-conically shaped, outwardly tapered outer portions 18*c* of the openings, which portions are adapted to accommodate the frusto-conical wedging surfaces 26*a* on the heads of the cap screws 26**.

Referring to FIG. 3, it will be seen that the center axes between one pair of flat sides of the square-shaped opening **20*a* in the enlarged end portion 20 of the arm 16 and in the opening 18*a* of the hub section 18 are angularly offset by an amount indicated by the angle "C". This angular offset can also be seen by the misalignment of the threaded openings 20*b* of the arm within the elliptical openings 18*b* of the hub 18 when placed in juxtaposition ready for assembly onto the shaft 12. When the cap screws 26 are inserted, the frusto-conical wedging surfaces 26*a* of the headed portions thereof begin to engage the frusto-conically tapered surfaces 18*c* in the hub or wedge plate 18 and as the screws are further tightened the hub is drawn toward the lower face of the arm 16 while at the same tim the wedging action between the surfaces 26*a* and 18*c* causes a slight amount of relative rotation between the arm and hub to provide the flatted surfaces on the lower end 12*a* of the shaft into a scissors-like pressure grip. As the cap screws 26 are tightened further, the frusto-conical wedging surfaces 26*a* of the heads thereof tend to move toward the center of the frusto-conically shaped portions 18*c* of the openings in the wedge plate of hub 18 and as this happens, the hub 18 and the arm 16 continue to rotate relative to one another to apply the scissors-type pinching action on the shaft 12**.

This arrangement provides a self-locking and a high stress capability connection between the arm assembly 10 and the door closer shaft 12. The pinching or scissors action permits a relatively thin flat arm and associated wedge plate to be used in contrast to a much thicker cast-type shaft socket of the prior art. In addition, the unique wedging arrangement permits the use of punched metal parts which are stronger, cheaper and easier and faster to manufacture than cast metal parts typical of the prior art. The unique arrangement also permits rapid detachment of the arm assembly 10 from the shaft 12 so that the door closer may be serviced as required. Reconnection or remounting of the arm assembly on the shaft is simple and rapid. The cap screws 26 are first loosely threaded into the openings **20*b* in the enlarged pivot end portion 20 of the arm 16 and the assembled together arm and wedge plate are then mounted onto the flatted portions at the lower end 12*a* of the shaft. The screws 26 are tightened until the hub and arm are tightly drawn together. The relative rotation between the arm 16 and hub 18 act as a locking device or lock washer tending to prevent the cap screws 26** from working loose during repeated pivoting action of the door closer arm.

Although the present invention has been described with reference to a single illustrated embodient thereof, it should be understood that numerous other modifications and embodiments can be devised by those skilled in the art that will fall within the spirit and scope of the principles of this invention.

What is claimed as new and desired to be secured by Letters Patent of the United States is:

1. A lever apparatus adapted to be detachably mounted on a rotary shaft, comprising:

lever arm means having an opening therein dimensioned to receive a portion of said shaft extended transversely between opposite faces, wedge plate means adapted to be shiftably mounted on one face of said lever arm and formed with an opening for said shaft extended transversely therethrough, and at least one fastener having a threaded shank and a frusto-conical wedging surface in coaxial alignment therewith adjacent a head portion for securing said wedge plate means to said lever arm means at a point outwardly of said openings therein, a wedging surface on at least one of said means engaged by said wedging surface of said fastener, the other of said means including a threaded opening for receiving the threaded shank of said fastener and said one means including a generally oblong shaped opening aligned with said wedging surface thereof permitting said fastener shank to be extended therethrough into threaded engagement with said threaded opening, whereby threading of said fastener into said threaded opening causes said two wedging surfaces to engage and shift said two means relative to each other along the elongate direction of said oblong opening, to shift the relative positions of said two shaft openings to more tightly clamp the lever apparatus against a said shaft inserted in said two shaft openings.

2. The lever apparatus of claim 1 wherein said lever arm means and wedge plate means are formed of thin flat sheet material and wherein said fastener comprises a flat headed screw with a threaded shank, said wedging surface comprising a frustroconical opening in one of said means for receiving a frustroconical head portion of said screw so that the flat head surface thereof may be flush with an adjacent outer surface of said means.

3. The lever apparatus of claim 2 wherein said shaft is of a polygonal shaped cross-section and said openings of said lever arm means and said wedge plate means are of matching shape, said frustroconical opening in one of said means spaced outwardly of the shaft opening therein and centered on a radial having a selected angular relation with one side of said polygonal shaft opening, the other of said means having a threaded opening for threadedly receiving the thread shank of said fastener and spaced outwardly of the shaft opening centered on a radial having a different selected angular relation with respect to one side of said polygonal shaft opening matching said one side in said one means, whereby tightening of said fastener angularly shifts said lever arm means and wedge plate means to tightly clamp said shaft.

4. The lever apparatus of claim 1 wherein said shifting of relative position includes relative rotation between said wedge plate means and said lever arm means about an axis of rotation substantially coaxial of said shaft.

5. The lever apparatus of claim 4 wherein said shaft has at least one planar surface thereon and said openings in said wedge plate means and lever arm means have matching planar surface defined therein bearing against said shaft surface.

6. The lever apparatus of claim 5 wherein said shaft is of a polygonal shaped cross-section and said openings of said lever arm means and said wedge plate means are of matching polygonal shape.

7. The lever apparatus of claim 6 including a pair of said fasteners disposed on opposite sides of said openings in said lever arm means and said wedge plate means.

* * * * *